June 18, 1963  M. E. KENNEY ETAL  3,094,536
SILICON PHTHALOCYANINES

Filed Jan. 3, 1961  3 Sheets-Sheet 1

INVENTORS.
MALCOLM E. KENNY
BY RALPH D. JOYNER

Schramm, Kramer & Sturges
ATTORNEYS.

June 18, 1963  M. E. KENNEY ETAL  3,094,536
SILICON PHTHALOCYANINES
Filed Jan. 3, 1961  3 Sheets-Sheet 2

INVENTORS.
MALCOLM C. KENNY
BY RALPH D. JOYNER
Schramm, Framer & Sturges
ATTORNEYS.

United States Patent Office 3,094,536
Patented June 18, 1963

3,094,536
SILICON PHTHALOCYANINES
Malcolm E. Kenney, % Case Institute of Technology, University Circle, Cleveland 6, Ohio, and Ralph D. Joyner, Maple Heights, Ohio (544 Roslyn Ave., Akron 20, Ohio)
Filed Jan. 3, 1961, Ser. No. 80,227
6 Claims. (Cl. 260—314.5)

This invention relates to silicon phthalocyanine materials which are characterized by an atom of silicon centrally located within a phthalocyanine nucleus.

Metal phthalocyanine derivatives are widely known and used as pigmentary materials because of their extreme stability. Notable among these is copper phthalocyanine. Most of the known metal derivatives of phthalocyanine and its related compounds are divalent metal derivatives. However, the commonly available metal phthalocyanines, and particularly copper phthalocyanine, are subject to variations in form which cannot readily be controlled.

It has now been found that silicon phthalocyanines can be made, and because of the tetravalent nature of silicon, it is now possible to exercise control in the phthalocyanine molecule at a central point and in a way that may result in either a symmetrically or asymmetrically substituted material. The silican phthalocyanines of the present invention possess remarkable stability and color properties which make them highly useful as pigments for use in paints and in enamels.

In connection with FIGS. 1 to 7 inclusive, the ring structure shown in the lower right hand corner of the structural formulae is not in the true sense of the word an aromatic group, being more properly, quinoid. For the purposes of this specification, however, the Ar groups will be considered as if they were all aromatic since the only significant difference is in the means by which the Ar group is bonded to the balance of the molecule. It should be noted that the structure drawn for the macrocyclic ring is one of the contributing structures of the resonance hybrid structure, which it is theorized represents the ring system. The distribution of charge throughout similar parts of the ring system is presumed to be the same. Thus all of the equivalent small ring systems making up the macrocycle possess equal aromatic character. The nomenclature is in accordance with conventional practice in the phthalocyanine field.

Figure 1:
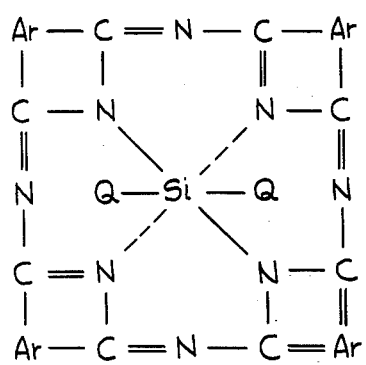
FIG. 1 is a general structural formula for silicon phthalocyanine compounds in accordance with the present invention.

Briefly stated, then, the present invention is in the provision of a new class of silicon phthalocyanines having the general formula shown in FIG. 1 in the annexed drawings. As indicated above, Ar is an aromatic radical. Q is a group capable of bonding to silicon and may be, for example a halogen, e.g. chlorine, bromine, iodine, and fluorine; an aroxy or thioaroxy group, for example, phenoxy, and thiophenoxy; alkoxy or thioalkoxy, for example, methoxy and thiomethoxy; cycloalkoxy or thiocycloalkoxy, for example cyclohexoxy and thiocyclohex-oxy; triarylsiloxy or trialkylsiloxy, for example, triphenylsiloxy or trimethylsiloxy; hydroxy and mercapto; and various modifications of the foregoing substituents. The aromatic radicals, Ar, are in most instances phenylene, but may be arylene radicals derived from naphthylene or anthracene, or any of the substituted arylene radicals of which the prior art is well aware. Examples of such substituted arylene radicals include, for example, chlorinated phenylene, sulphonated phenylene, nitrated phenylene, aroxy phenylene, alkoxy phenylene, etc., examples of which are hereinafter more specifically set forth.

The preparation of the new silicon phthalocyanine derivatives in accordance with the present invention are conveniently illustrated at this point by specific examples. It should be understood that these examples are for illustrative purposes, only, and not to be construed as limiting the invention to the precise methods or compounds described therein.

Example I

Figure 2:
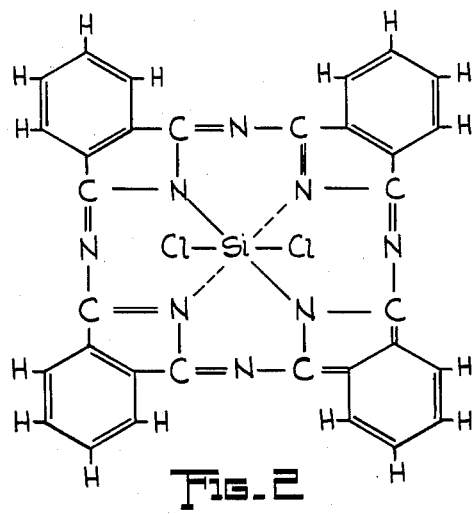
FIG. 2 is a structural formula for dichloro silicon phthalocyanine.

*Dichloro silicon phthalocyanine.*—A mixture of 50 ml. (0.45 mole) of silicon tetrachloride and 50 grams (0.39 mole) of phthalonitrile were placed in a 75 ml. quantity of quinoline and brought very slowly to reflux (240° C.) with constant stirring. Because of the large volume of low boiling $SiCl_4$ (B.P. 58° C.) it was necessary to hold this material in a second container and to repeatedly distill it back into the reaction during the run in order to reach and maintain the temperature of 240° C. Heating and stirring were continued for a period of four hours. This reaction yielded 4.2 grams of dichloro silicon phthalocyanine which was a yield of 7% based on the silicon tetrachloride. This product has an empirical formula $C_{32}H_{16}N_8SiCl_2$, a structural formula as shown in FIG. 2 and a calculated molecular weight of 611.54. The theoretical analysis for such a product is carbon 62.85%; hydrogen 2.62%; silicon 4.59%; and chlorine 11.60%. The analysis actually found was: carbon 63.26%, hydrogen 2.86%; silicon 4.90%; and chlorine 11.80%.

Example II

*Dichloro silicon phthalocyanine.*—A separate method of preparation the silicon phthalocyanine derivative was found using hexachlorodisiloxane. The yield was still low.

A mixture of 50 grams (0.18 mole) of hexachlordisiloxane, $Cl_3SiOSiCl_3$ (B.P. 137° C.), and 200 grams of phthalonitrile (1.6 moles) was placed in 400 ml. of quinoline and brought very slowly to 240° C. with constant stirring. It was unnecessary in this run to distill from a second container because of the higher boiling point of the hexachlorodisiloxane. Heating and stirring were continued for a period of four hours. Separation of product from the tarry impurities was accomplished with relative ease by decanting several times with about one liter of acetone and 500 ml. of dimethyl foramid. Decantation removed the lighter solid impurities while the dense crystalline dichloro silicon phthalocyanine remained behind. Finally, extraction with acidic acid for six hours and two washings with acetone gave a cleaner product than that obtained in Example I above. A yield of 26 grams (0.042 mole) of dichloro silicon phthalocyanine was obtained.

In order to purify the material, a 500 mg. sample covered with platinum gauze was heated in a vacuum sublimator to 430–450° C. for one hour under a pressure of 2 microns. The collecting finger was cooled with boiling mercury. Two hundred and fifty mg. of a slightly impure product were obtained but a resublimation of this material under identical conditions gave 75 mg. of excellent red crystals which transmitted green. The calculated theoretical analysis and the empirical formula are the same as given above in Example I.

Example III

*Dihydroxy silicon phthalocyanine.*—A 250 mg. sample of sublimed dichloro silicon phthalocyanine was hydrolyzed completely with 20 ml. of refluxing 1:1 pyridine-concentrated ammonia solution in ten hours. The infrared spectrum showed a strong peak at 831 cm.$^{-1}$ which is attributed to the SiOH. This product has an empirical formula $C_{32}H_{18}N_8SiO_2$ and a structure like that shown in FIG. 3. This product has a calculated molecular weight of 574.60. The theoretical analysis for dihydroxysilicon phthalocyanine is carbon 66.89%; hydrogen 3.16%; nitrogen 19.50%; and silicon 4.88%. The actual analysis showed carbon 66.94%; hydrogen 3.51%; nitrogen 19.52%; and silicon 5.07%.

Example IV

Figure 4:
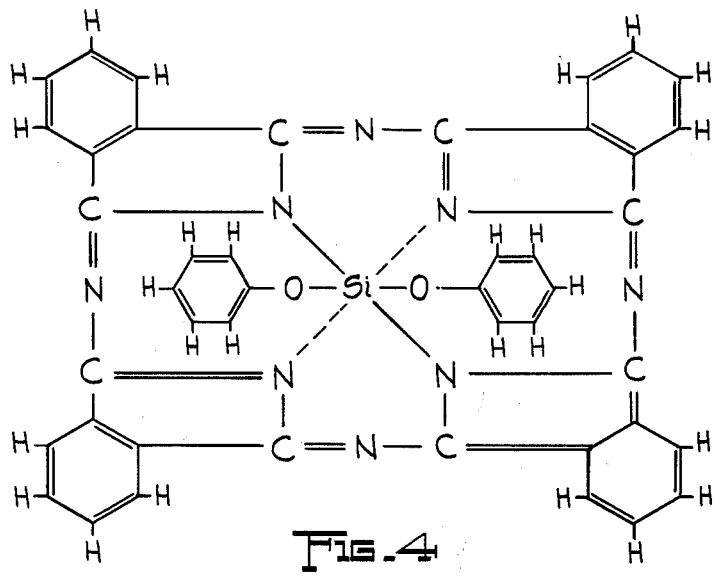
FIG. 4 is a structural formula for di-phenoxy silicon phthalocyanine.

*Diphenoxy silicon phthalocyanine.*—This product could not be produced by simple reaction of phenol with a product produced in accordance with Example III above. It was necessary to resort to a fusion reaction to prepare the compound. 0.3 gram of dichloro silicon phthalocyanine crystals was hydrolyzed with 20 ml. of an equal volume mixture of pyridine and concentrated ammonia. After filtering, the resultant solid was treated with 1.5 grams of molten phenol and 5 drops of pyridine followed by cooling and washing with benzene. A crystalline product resulted. This material was purified by sublimation for 2.5 hours on to a collecting finger maintained at 260° C. by refluxing 1-chloronaphthalene. 75 mg. of well-formed crystals were obtained which were blue-green by transmitted light. This product has an empirical formula $C_{44}H_{26}N_8SiO_2$ and a structure as shown in FIG. 4 of the annexed drawings. This product has a calculated molecular weight of 726.84. The theoretical analysis for such a material is carbon 72.71%; hydrogen 3.61%; and silicon 3.86%. There were found, carbon 73.19%; hydrogen 3.84%; and silicon 3.81%.

Example V

Figure 5:
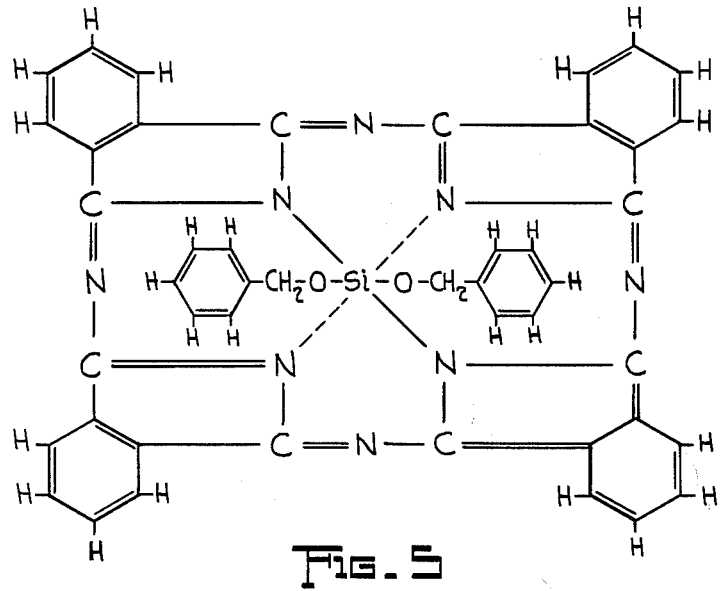
FIG. 5 is a structural formula for di-benzoxy silicon phthalocyanine.

*Dibenzoxy silicon phthalocyanine.*—When either dichloro silicon phthalocyanine or dihydroxy silicon phthalocyanine produced in accordance with the foregoing examples is treated with benzyl alcohol at reflux, a soluble derivative dibenzoxy silicon phthalocyanine is formed directly in essentially 100% yield. Such a derivative was recrystallized from benzyl alcohol. 500 ml. of saturated solution gave 3.6 grams of well formed red crystals upon cooling for 2 days. The infrared spectrum of this material showed a peak at 698 cm.$^{-1}$ confirming the presence of monosubstituted benzene. The same infrared spectrum results whether the starting material is dichlorosilicon phthalocyanine or dihydroxysilicon phthalocyanine. This product has an empirical formula $C_{46}H_{30}N_8SiO_2$ and a structural formula as shown in FIG. 5 of the annexed drawings. The theoretical analysis for this material is carbon 73.19%; hydrogen 4.01%; nitrogen 14.84%; and silicon 3.72%. Actual analysis of the product showed carbon 72.73%; hydrogen 4.47%; nitrogen 16.29%; and silicon 4.10%.

Example VI

Figure 7:
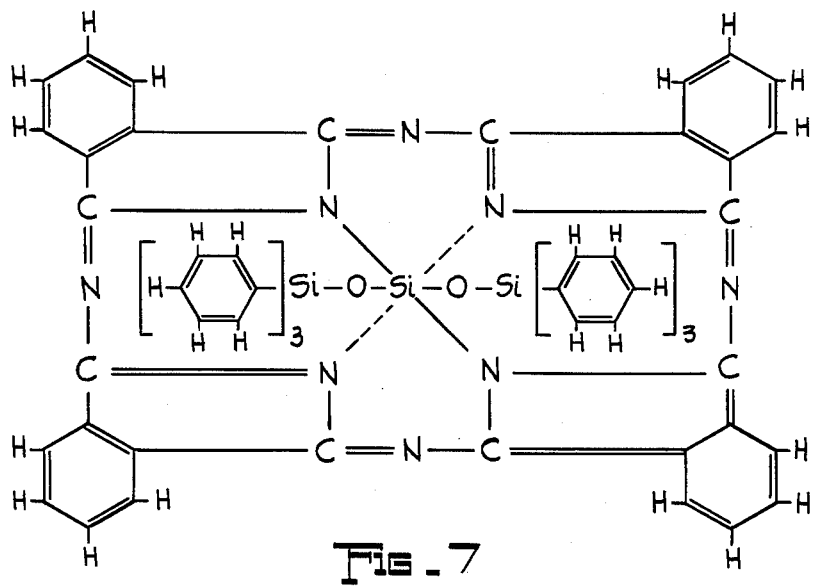
FIG. 7 is a structural formula for bis-(triphenyl siloxy) silicon phthalocyanine.

*Bis (triphenylsiloxy) silicon phthalocyanine.*—450 gm. of dibenzoxysilicon phthalocyanine produced in accordance with Example V was treated with 250 mg. of triphenylsilanol in 5 ml. of benzyl alcohol, and the entire example heated at reflux (205° C.). Upon cooling, the solution was almost clear and apparently complete conversion to bis (triphenylsiloxy) silicon phthalocyanine resulted. This compound was redissolved in refluxing benzyl alcohol in which a small amount of triphenylsilanol had been dissolved, and allowed to cool after filtration of the hot solution. Beautiful purple crystals formed within an hour. The infrared spectrum showed two large peaks near 700 cm.$^{-1}$, confirming the presence of monosubstituted benzenes. This product has an empirical formula $C_{68}H_{46}N_8Si_3O_2$. This product has a structural formula as shown in FIG. 7 of the annexed drawings, and a theoretical analysis of carbon 74.84%; hydrogen 4.25%; nitrogen 10.27%; and silicon 7.71%. There were found carbon 75.15%; hydrogen 4.26%; nitrogen 10.32%; and silicon 7.72%.

Example VII

Figure 6:
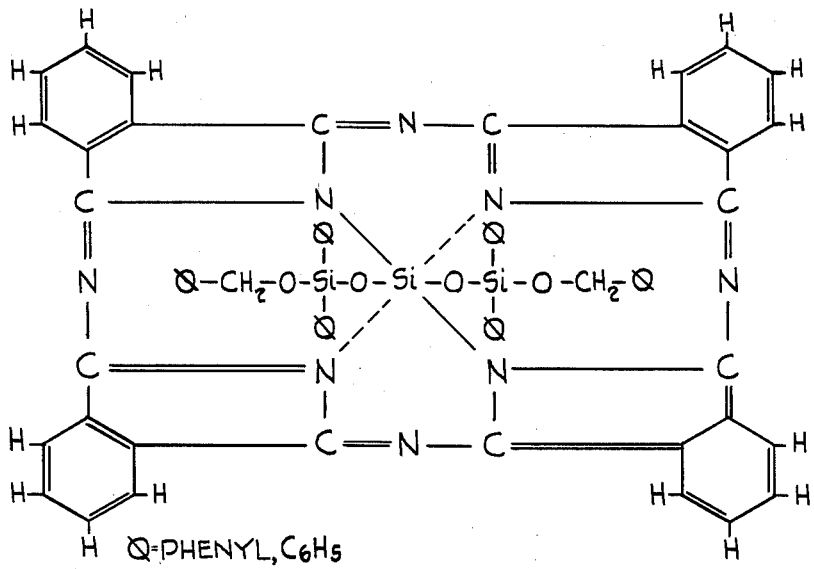
FIG. 6 is a structural formula for bis-(diphenyl benzoxy siloxy) silicon phthalocyanine.

*Bis (diphenylbenzoxysiloxy) silicon phthalocyanine.*—This compound was prepared from solution in the same manner as the triphenylsilanol derivative of Example VI above. When a 350 mg. sample of dibenzoxysilicon phthalocyanine was treated with 200 mg. of diphenylsilanediol in refluxing benzyl alcohol for 2 minutes and allowed to cool for one hour, blue-green crystals were formed from solution. These crystals were recrystallized from a fresh solution of 100 mg. of diphenylsilanediol in 3 ml. benzyl alcohol. This compound has an empirical formula $C_{70}H_{50}N_8Si_3O_4$ and a structural formula as shown in FIG. 6 in the annexed drawings. The theoretical analysis for this material is carbon 72.89%; hydrogen 4.37%; and silicon 7.30%. The product analyzed carbon 73.20%; hydrogen 4.54%; and silicon 7.52%.

The infrared spectra of each of the compounds of the present invention are characteristic and cannot in any case be ascribed to mere mixtures of reactants. The spectra also serve in certain cases to corroborate the conclusions reached about the nature of the compounds based on reaction chemistry and analytical work.

For example the silicon phthalocyanines already described which have monosubstituted benzene rings in their structures have spectra with bands very near 700 cm.$^{-1}$. This is in agreement with the observation that many compounds having monosubstituted benzene rings in their structures show absorption in this region. Two specific instances of the occurrence of such bands in the silicon phthalocyanines are the bands at 701 cm.$^{-1}$ in the phenoxide and at 703 cm.$^{-1}$ in the triphenylsiloxide. In contrast the dihydroxide which contains no monosubstituted benzene rings shows no bands in this region. The dichloride has a spectrum with a band at 695 cm.$^{-1}$, but this is obviously not associated with monosubstituted benzene rings. All of the silicon phthalocyanines of the present invention have spectra with absorption bands in the 730–770 cm.$^{-1}$ region and because of this the region is not useful for the further verification of the presence or absence of monosubstituted benzene rings.

Absorption in the 830–880 cm.$^{-1}$ region is characteristic of compounds containing the SiOH grouping and accordingly the spectrum of dihydroxysilicon phthalocyanine has an absorption in this region. The absorption is strong and has a maximum at 831 cm.$^{-1}$.

The compound diphenoxysilicon phthalocyanine gives a spectrum with a strong absorption at 1268 cm.$^{-1}$. Because aromatic ethers show absorption in the 1270–1230 cm.$^{-1}$ region, the 1268 cm.$^{-1}$ band in the phenoxide may be associated with the phenoxy group.

The dihydroxide shows a broad infrared band centered on 3535 cm.$^{-1}$. This band is undoubtedly associated with the presence of the OH groups. A spectral band characteristic of all the silicon phthalocyanines described in this invention occurs in the region from 912–916 cm.$^{-1}$. This band is generally sharp and similar in shape for each of these silicon phthalocyanines. At the present time no definite assignment can be given to it.

It appears, therefore, that the infrared spectra confirm the compounds described.

Figure 3:
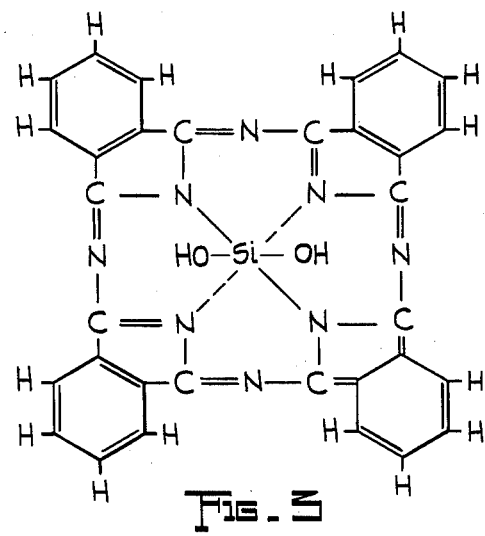
FIG. 3 is a structural formula for dihydroxy silicon phthalocyanine.

There have been illustrated above several derivatives of silicon phthalocyanine, and as will now be evident to those skilled in the art, numerous other analogues may be prepared by starting with a halide intermediate, such as that produced in accordance with Examples I and II and for which a specific structure is shown in FIG. 2 of the annexed drawings, or the dihydroxy derivative of Example III as shown in FIG. 3 of the annexed drawings. The ability to make substitutions at will upon the nuclear silicon atom to produce symmetrical or asymmetrical substitution products permits a control of the properties of a final product. A further degree of control may also be exercised by variation in the substituents which appear on the aromatic radicals.

Additional examples of silicon phthalocyanine compounds illustrative of variations which may be made in accordance herewith are as follows: chlorinated dichlorosilicon phthalocyanine, dichlorosilicon tetra (4) chlorophthalocyanine, dichlorosilicon tetra (4) methoxy phthalocyanine, diphenoxy silicon tetra (4) chlorophthalocyanine, dibenzoxy silicon tetra (4) benzoxy phthalocyanine, dichloro - silicon chloronaphthalocyanine, dichlorosilicon tetra (4) benzoyl phthalocyanine; dichloro silicon tetra (4) sulphophthalocyanine, diphenoxy silicon tetra (4) thiobutoxy phthalocyanine, dichlorosilicon tetra (4) nitrophthalocyanine, dihydroxy silicon tetra (4) hydroxy phthalocyanine, etc.

The novel products of the present invention are especially useful as pigments in paints, enamels and textile printing compositions according to conventional procedures for utilizing pigments. Properties such is dispersability, color stability and so forth may be controlled by selection of the substituent groups attached either to the silicon atom, or to the arylene, Ar, groups.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. Dihalogen silicon phthalocyanine.
2. Dichloro silicon phthalocyanine.
3. Dihydroxy silicon phthalocyanine.
4. Di-phenoxy silicon phthalocyanine.
5. Bis-(p-phenylphenoxy) silicon phthalocyanine.
6. Bis-triphenylsiloxy silicon phthalocyanine.

References Cited in the file of this patent

Venkataraman: Synthetic Dyes, vol. II, Academic Press, New York (1952), page 1127.

Rochow et al.: The Chemistry of Organometallic Compounds, Wiley, New York (1957), pages 6, 9, 11, 17 and 182.